United States Patent
Sato et al.

(10) Patent No.: US 11,232,530 B2
(45) Date of Patent: Jan. 25, 2022

(54) INSPECTION ASSISTANCE DEVICE, INSPECTION ASSISTANCE METHOD, AND RECORDING MEDIUM

(71) Applicant: NEC CORPORATION, Tokyo (JP)

(72) Inventors: Takami Sato, Tokyo (JP); Kota Iwamoto, Tokyo (JP); Yoshinori Saida, Tokyo (JP); Shin Norieda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 156 days.

(21) Appl. No.: 16/489,037

(22) PCT Filed: Feb. 28, 2017

(86) PCT No.: PCT/JP2017/007784
§ 371 (c)(1),
(2) Date: Aug. 27, 2019

(87) PCT Pub. No.: WO2018/158818
PCT Pub. Date: Sep. 7, 2018

(65) Prior Publication Data
US 2020/0005421 A1  Jan. 2, 2020

(51) Int. Cl.
*G06T 1/00* (2006.01)
*G06T 1/20* (2006.01)
*G06T 1/60* (2006.01)

(52) U.S. Cl.
CPC ............. *G06T 1/0007* (2013.01); *G06T 1/20* (2013.01); *G06T 1/60* (2013.01)

(58) Field of Classification Search
None
See application file for complete search history.

(56) References Cited

U.S. PATENT DOCUMENTS 6,434,525 B1 *  8/2002  Nagisa .................... G10L 21/06
                                                                      704/260
8,416,217 B1 *  4/2013  Eriksson ................. G06F 3/017
                                                                      345/175

(Continued)

FOREIGN PATENT DOCUMENTS

JP     06-186140 A    7/1994
JP     2002-298272 A  10/2002

(Continued)

OTHER PUBLICATIONS

International Search Report for PCT/JP2017/007784 dated May 16, 2017 (PCT/ISA/210).

(Continued)

*Primary Examiner* — Anand P Bhatnagar
(74) *Attorney, Agent, or Firm* — Sughrue Mion, PLLC

(57) ABSTRACT

Provided is an inspection assistance device which includes: a first acquisition unit that acquires first data which is image data used to acquire results of inspection on a to-be-inspected object; a second acquisition unit that acquires second data that is different in type from the first data and is used to acquire results of inspection on the to-be-inspected object; and a display control unit that causes a display unit to display a result of comparison between first inspection result information pertaining to the inspection results based on the acquired first data and second inspection result information pertaining to the inspection results based on the acquired second data in such a manner as to be superimposed on an image in which the inspected object is displayed.

13 Claims, 12 Drawing Sheets

(56) References Cited

U.S. PATENT DOCUMENTS

| | | | |
|---|---|---|---|
| 9,563,297 B2* | 2/2017 | Kato | G06F 3/0481 |
| 9,569,001 B2* | 2/2017 | Mistry | H04N 9/3173 |
| 9,818,225 B2* | 11/2017 | Mao | G02B 27/017 |
| 9,927,869 B2* | 3/2018 | Kwon | G06F 3/0236 |
| 10,191,282 B2* | 1/2019 | Ikeda | G06F 3/0426 |
| 2007/0129914 A1 | 6/2007 | Yano et al. | |
| 2008/0231608 A1* | 9/2008 | Nagata | G06F 3/0426 345/173 |
| 2010/0199232 A1* | 8/2010 | Mistry | G06F 3/0425 715/863 |
| 2013/0241837 A1* | 9/2013 | Oga | G06F 3/04886 345/168 |
| 2015/0277113 A1* | 10/2015 | Border | G06F 3/012 345/8 |
| 2016/0035136 A1* | 2/2016 | Sendai | G06F 3/012 345/633 |
| 2017/0091980 A1* | 3/2017 | Sebastian | G06T 15/205 |
| 2017/0255838 A1* | 9/2017 | Norieda | G06K 9/4671 |
| 2019/0235692 A1* | 8/2019 | Sarnoff | G09G 5/006 |

FOREIGN PATENT DOCUMENTS

| | | |
|---|---|---|
| JP | 2007-149070 A | 6/2007 |
| JP | 2014120066 A | 6/2014 |
| JP | 2014-235704 A | 12/2014 |
| JP | 2015-011726 A | 1/2015 |
| JP | 2015-153342 A | 8/2015 |
| JP | 2015-225467 A | 12/2015 |
| WO | 2012/046726 A1 | 4/2012 |
| WO | 2014/097413 A1 | 6/2014 |

OTHER PUBLICATIONS

Written Opinion for PCT/JP2017/007784 dated May 16, 2017 (PCT/ISA/237).

Communication dated Sep. 29, 2020, from the Japanese Patent Office in Application No. 2019-502320.

* cited by examiner

| INSPECTION TARGET NAME | STATE INFORMATION |
|---|---|
| THERMOMETER 31 | 6°C |
| THERMOMETER 32 | 10°C |
| SWITCH 33 | ON |
| ... | ... |

80 FIRST INSPECTION RESULT INFORMATION

| INSPECTION TARGET NAME | INSPECTION RESULT INFORMATION |
|---|---|
| THERMOMETER 31 | 4°C |
| THERMOMETER 32 | 10°C |
| SWITCH 33 | ON |
| ... | ... |

90 SECOND INSPECTION RESULT INFORMATION

103 DISPLAY SCREEN

| INSPECTION TARGET NAME | INSPECTION ITEM | COMPARISON RESULT |
|---|---|---|
| THERMOMETER 31 | MEASURE TEMPERATURE | MISMATCH |
| THERMOMETER 32 | MEASURE TEMPERATURE | MATCH |
| SWITCH 33 | CHECK WHETHER SWITCH IS ON | MATCH |
| ... | ... | ... |

121 RECORDED INFORMATION

141 DISPLAY SCREEN

| INSPECTION TARGET NAME | INSPECTION ITEM | CONDITION |
|---|---|---|
| THERMOMETER 31 | CHECK WHETHER TEMPERATURE SATISFIES CONDITION | 5°C > |
| THERMOMETER 32 | CHECK WHETHER TEMPERATURE SATISFIES CONDITION | 14°C > |
| SWITCH 33 | CHECK WHETHER SWITCH IS ON | ON |
| ... | ... | ... |

151 INSPECTION TARGET INFORMATION

Fig.16

| INSPECTION TARGET NAME 152 | INSPECTION ITEM 153 | CONDITION 154 | STATE INFORMATION 165 | FIRST INSPECTION RESULT INFORMATION 166 | SECOND INSPECTION RESULT INFORMATION 167 | COMPARISON RESULT 168 |
|---|---|---|---|---|---|---|
| THERMOMETER 31 | CHECK WHETHER TEMPERATURE SATISFIES CONDITION | 5°C > | 6°C | NG | OK | MISMATCH |
| THERMOMETER 32 | CHECK WHETHER TEMPERATURE SATISFIES CONDITION | 14°C > | 10°C | OK | OK | MATCH |
| SWITCH 33 | CHECK WHETHER SWITCH IS ON | ON | ON | OK | OK | MATCH |
| ... | ... | ... | ... | ... | ... | ... |

161 RECORDED INFORMATION

INSPECTION ASSISTANCE DEVICE, INSPECTION ASSISTANCE METHOD, AND RECORDING MEDIUM

CROSS REFERENCE TO RELATED APPLICATIONS

This application is a National Stage of International Application No. PCT/JP2017/007784 filed Feb. 28, 2017, the disclosure of which is incorporated herein in its entirety by reference.

TECHNICAL FIELD

The present disclosure relates to an inspection assistance device, an inspection assistance method, and a recording medium.

BACKGROUND ART

Methods of assisting inspection work on equipment such as a measuring instrument are disclosed. For example, PTL 1 describes an inspection assistance device recognizing identification information and a measured value of a measuring instrument, based on image information of the measuring instrument captured by a camera, and storing the measured value into a storage unit in association with the identification information of the measuring instrument.

Further, PTL 2 describes a substrate production assistance system displaying, when a plurality of recognition targets exist in a visual field of a worker, production information indicating availability or the like of the plurality of recognition targets in association with identification markers in the visual field of the worker on a one-to-one basis in the proximity of the identification marker.

Further, PTL 3 describes an equipment inspection device determining inspection result data by comparing first numerical data generated from image data with second numerical data generated from voice data.

CITATION LIST

Patent Literature

PTL 1: International Application Publication No. WO 2012/046726
PTL 2: Japanese Unexamined Patent Application Publication No. 2014-235704
PTL 3: Japanese Unexamined Patent Application Publication No. 2015-153342

SUMMARY OF INVENTION

Technical Problem

In the technology described in PTL 1, identification information and a measured value of a measuring instrument are recognized, and the recognition result is stored in the storage unit. In order to grasp a recognition result with respect to a measured value during an inspection, a worker needs to check the result with a processing terminal on hand. Similarly, in the technology described in PTL 3, a worker needs to check data displayed on a display unit on a mobile terminal by visual observation. However, in such a case, the worker needs to move his/her line of sight from the measuring instrument to the processing terminal, and thus working efficiency may be degraded. Further, in a case of correctness of an inspection result being checked by visual observation of information displayed on a processing terminal or a mobile terminal, as is the case with the technologies described in PTLs 1 and 3, even when there is a mismatch between the inspection result and an actual state, the mismatch may be overlooked.

Further, the technology described in PTL 2 displays information about identified equipment being stored in a storage unit or the like by reading an identification marker. Accordingly, in the technology described in PTL 2, a worker cannot grasp, while working, information related to a result of an inspection performed on the equipment at the time of reading the identification marker.

The present disclosure has been made in view of the aforementioned problems, and an object of the present disclosure is to provide a technology of enhancing efficiency of inspection work.

Solution to Problem

An inspection assistance device according to an aspect of the present disclosure includes a first acquisition means configured to acquire first data being image data used for acquiring an inspection result of an inspection target, a second acquisition means configured to acquire second data being used for acquiring an inspection result of the inspection target and being a different type of data from the first data, and a display control means configured to cause a display unit to display a comparison result between first inspection result information about an inspection result based on the acquired first data and second inspection result information about an inspection result based on the acquired second data, so as to superimpose the comparison result on an image in which the inspection target is displayed.

Further, an inspection assistance method according to an aspect of the present disclosure includes acquiring first data being image data used for acquiring an inspection result of an inspection target, acquiring second data being used for acquiring an inspection result of the inspection target and being a different type of data from the first data, causing a display unit to display a comparison result between first inspection result information about an inspection result based on the acquired first data and second inspection result information about an inspection result based on the acquired second data, so as to superimpose the comparison result on an image in which the inspection target is displayed.

A computer program providing the aforementioned device or method by a computer and a computer-readable non-transitory recording medium storing the computer program also fall under the category of the present disclosure.

Advantageous Effects of Invention

The present disclosure can enhance efficiency of inspection work.

BRIEF DESCRIPTION OF DRAWINGS

FIG. 16 is a diagram illustrating another example of recorded information recorded in the recording unit.

EXAMPLE EMBODIMENT

First Example Embodiment

Figure 1:
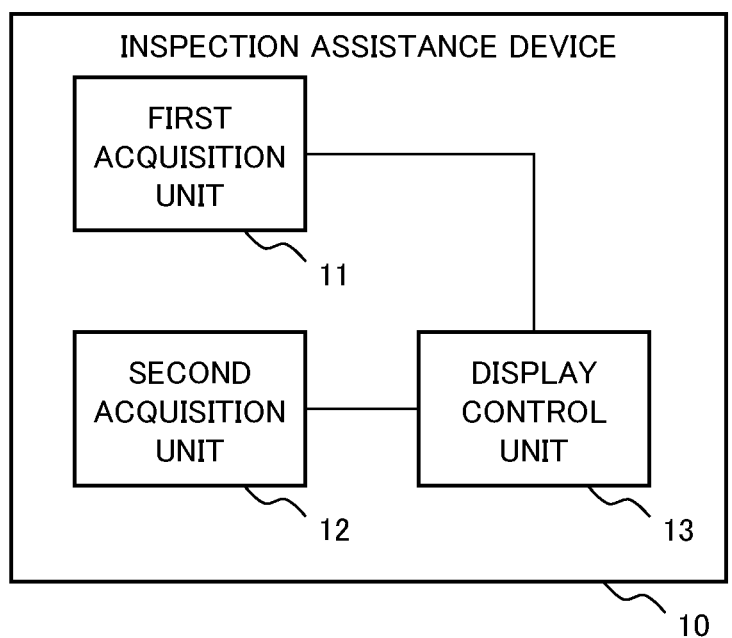
FIG. 1 is a functional block diagram illustrating an example of a functional configuration of an inspection assistance device according to a first example embodiment.
Figure 2:
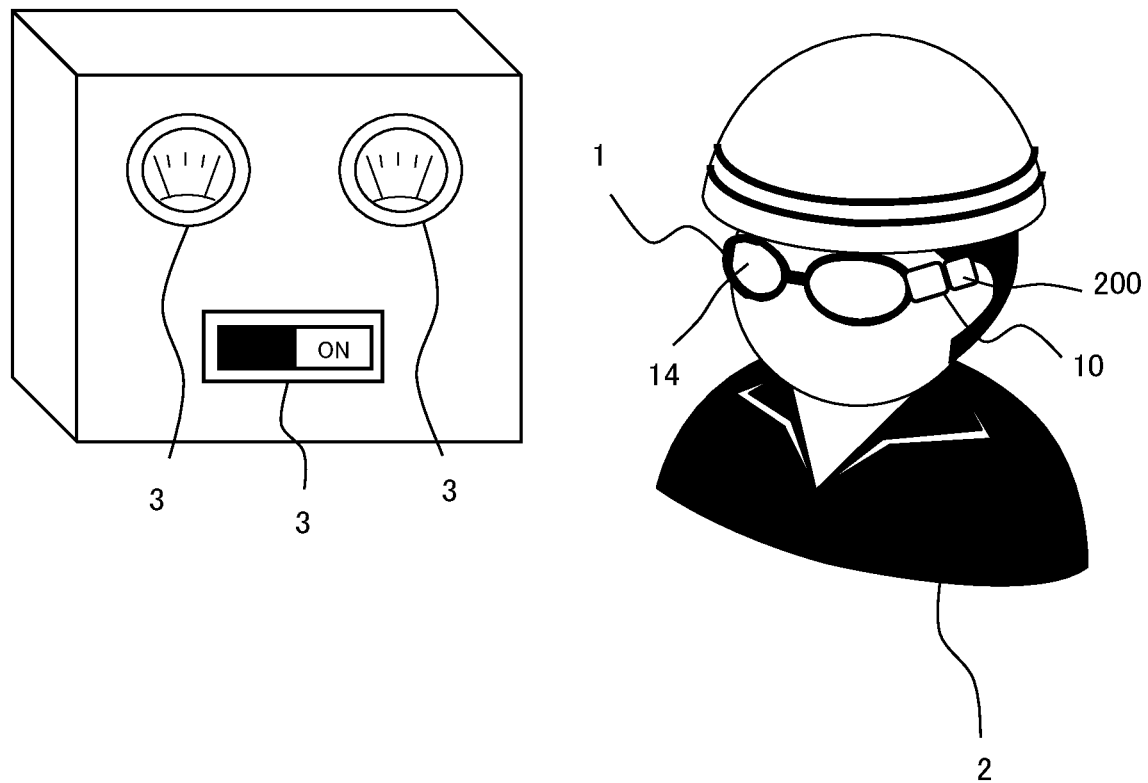
FIG. 2 is a diagram illustrating an application example of the inspection assistance device illustrated in FIG. 1.

A first example embodiment of the present disclosure will be described with reference to drawings. FIG. 1 is a functional block diagram illustrating an example of a functional configuration of an inspection assistance device 10 according to the present example embodiment. FIG. 2 is a diagram illustrating an application example of the inspection assistance device 10 illustrated in FIG. 1. For example, the inspection assistance device 10 is equipped on a glasses type wearable terminal, as illustrated in FIG. 2. The glasses type wearable terminal is hereinafter referred to as wearable glasses 1. For example, by a worker 2 wearing the wearable glasses 1 turning his/her face in a direction of an inspection target 3 such as a measuring instrument, an imaging device 200 equipped on the wearable glasses 1 captures an image of the inspection target 3. Consequently, the worker 2 checks an image in which the inspection target 3 is captured, through the wearable glasses 1. While the inspection assistance device 10 according to the present example embodiment is described on an assumption that the inspection assistance device 10 is equipped on the wearable glasses 1, the inspection assistance device 10 may be provided by a device communicable with the wearable glasses 1.

As illustrated in FIG. 1, the inspection assistance device 10 according to the present example embodiment includes a first acquisition unit 11, a second acquisition unit 12, and a display control unit 13.

The first acquisition unit 11 acquires first data being image data used for acquiring an inspection result of an inspection target. For example, the first acquisition unit 11 acquires image data captured by the imaging device 200 as first data. For example, the imaging device 200 is a camera including a lens and an imaging element. First data represent an image including an inspection target 3 and being captured by the imaging device 200. The image may be a dynamic image or a static image. Specifically, first data may include data of a plurality of frames constituting a dynamic image or may be static image data representing a static image. In a configuration in which the inspection assistance device 10 is built into the wearable glasses 1 as is the case with the present example embodiment, the first acquisition unit 11 may include the function of the imaging device 200. The first acquisition unit 11 provides the acquired first data for the display control unit 13.

The second acquisition unit 12 acquires second data being used for acquiring an inspection result of an inspection target and being a different type of data from first data. For example, second data may be data including information input by the worker 2 through an input device such as a keyboard or a touch panel. For example, second data may be voice data including voice input through a microphone or the like. The second acquisition unit 12 provides the acquired second data for the display control unit 13.

The display control unit 13 superimposes a comparison result between information about an inspection result based on acquired first data and information about an inspection result based on acquired second data on an image in which an inspection target is displayed and displays the resulting image on the display unit 14. Specifically, the display control unit 13 receives first data from the first acquisition unit 11 and based on the received first data, acquires information (referred to as first inspection result information) about an inspection result of an inspection target 3 included in an image represented by the first data.

Further, the display control unit 13 receives second data from the second acquisition unit 12 and based on the received second data, acquires information (referred to as second inspection result information) about an inspection result of the inspection target 3. For example, second inspection result information may be second data themselves including a numerical value and/or a character input by the worker 2 visually identifying an inspection target 3. Further, for example, when second data are voice data, second inspection result information may be an inspection result acquired from the input voice data.

Then, the display control unit 13 compares the first inspection result information with the second inspection result information. The display control unit 13 superimposes the comparison result on an image in which the inspection target 3 is displayed and causes the display unit 14 to display the resulting image. For example, an image in which an inspection target 3 is displayed is an image represented by first data acquired by the first acquisition unit 11. When a first image acquired by the first acquisition unit 11 is represented by image data composed of a plurality of frames, an image in which an inspection target 3 is displayed may be a frame out of the plurality of frames.

For example, the display unit 14 is a lens part of the wearable glasses 1, as illustrated in FIG. 2, and is provided by, for example, a display module transmitting external light and displaying information in accordance with an instruction from the display control unit 13 but is not limited to the above. The display unit 14 may be a module having a function of displaying, on a retina of the worker 2, an image generated by the display control unit 13 by superimposing a comparison result on an image in which an inspection target 3 is displayed. Thus, the display unit 14 may have a function of projecting an image generated by the display control unit 13, in accordance with control by the display control unit 13. The function of projecting an image generated by the display control unit 13 may be included in the display control unit 13. For example, assuming that the display unit 14 is a retina, the display control unit 13 may have a function of directly projecting, on the retina, an image acquired by superimposing a comparison result on an image in which an inspection target 3 is displayed.

Figure 3:
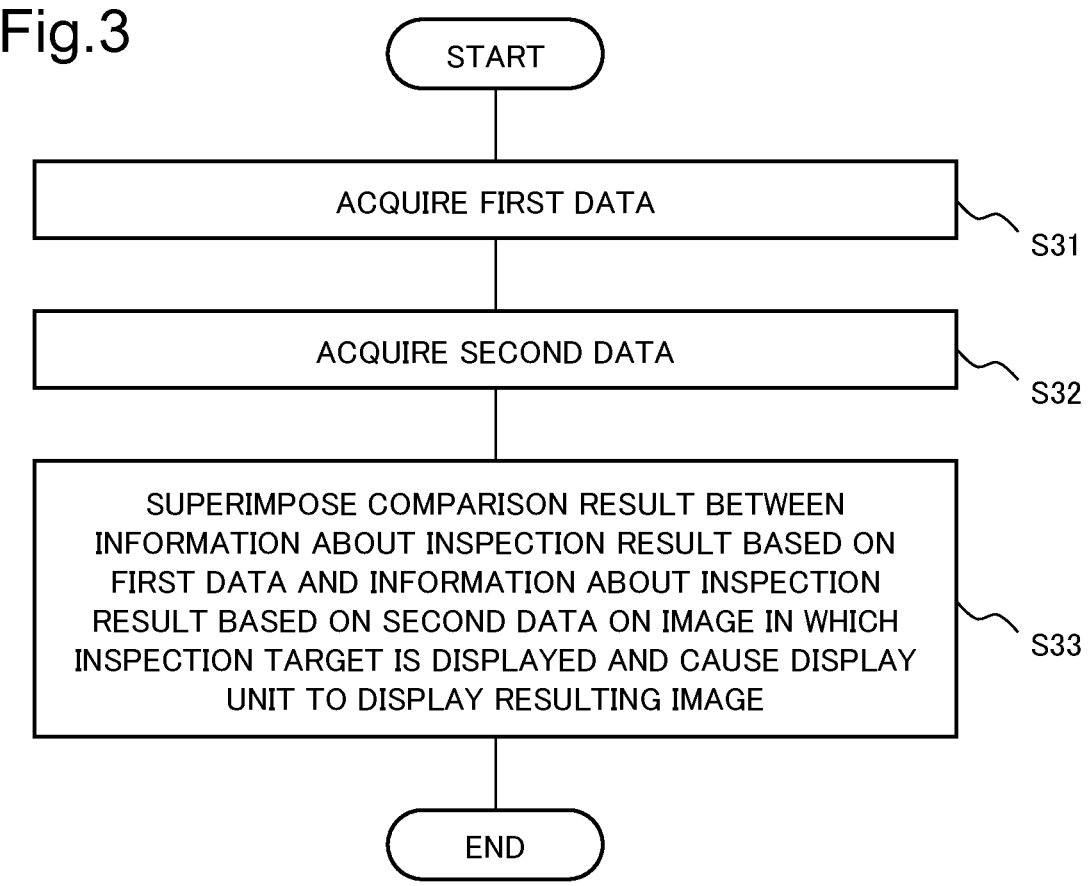
FIG. 3 is a flowchart illustrating an example of a processing flow in the inspection assistance device according to the first example embodiment.

FIG. 3 is a flowchart illustrating an example of a processing flow in the inspection assistance device 10 according to the present example embodiment. As described in FIG. 3, the first acquisition unit 11 acquires first data being image data used for acquiring an inspection result of an inspection target (Step S31). Further, the second acquisition unit 12 acquires second data being used for acquiring an inspection result of the inspection target and being a different type of data from the first data (Step S32). Then, the display control unit 13 superimposes a comparison result between information about an inspection result based on the acquired first data and information about an inspection result based on the acquired second data on an image in which the inspection target is displayed and causes the display unit 14 to display the resulting image (Step S33).

Thus, the inspection assistance device 10 superimposes the comparison result between first inspection result information about the inspection result based on the acquired first data and second inspection result information about the inspection result based on the acquired second data on the image in which the inspection target 3 is displayed and causes the display unit 14 to display the resulting image. Consequently, the worker 2 checking a screen displayed on the display unit 14 can grasp the inspection target 3, the first inspection result information about the inspection result based on the first data, and the second inspection result information about the inspection result based on the second data. For example, it is assumed that the first inspection result information about the inspection result based on the first data is a measured value recognized from image data and the second inspection result information about the inspection result based on the second data is a measured value input by the worker 2. In this case, the inspection assistance device 10 displays an inspection target 3 and a comparison result between the measured values with respect to the inspection target 3 on the screen. Consequently, merely by looking at the screen, the worker 2 can readily grasp whether or not the measured value recognized from the image data matches the measured value input by the worker 2 himself/herself.

For example, when being used to a repetitive action or inspection work, the worker 2 may make an input mistake or mistakenly grasp an inspection result. However, the inspection assistance device 10 according to the present example embodiment compares information about an inspection result based on image data with information about an input inspection result and therefore can allow the worker 2 to grasp a possibility of an input mistake even when the mistake by the worker 2 occurs.

Further, by the comparison result being superimposed on an image in which an inspection target 3 is displayed and the resulting image being displayed, the worker 2 can grasp the comparison result while turning his/her line of sight toward the inspection target 3. Accordingly, since the comparison result between the first inspection result information and the second inspection result information with respect to the inspection target 3 can be readily grasped, even when the comparison result indicates a mismatch between the first inspection result information and the second inspection result information, the worker 2 can readily grasp the difference. Accordingly, the present example embodiment can prevent the worker 2 from overlooking a difference between inspection results.

As described above, the inspection assistance device 10 according to the present example embodiment can enhance efficiency of inspection work.

Second Example Embodiment

Figure 4:
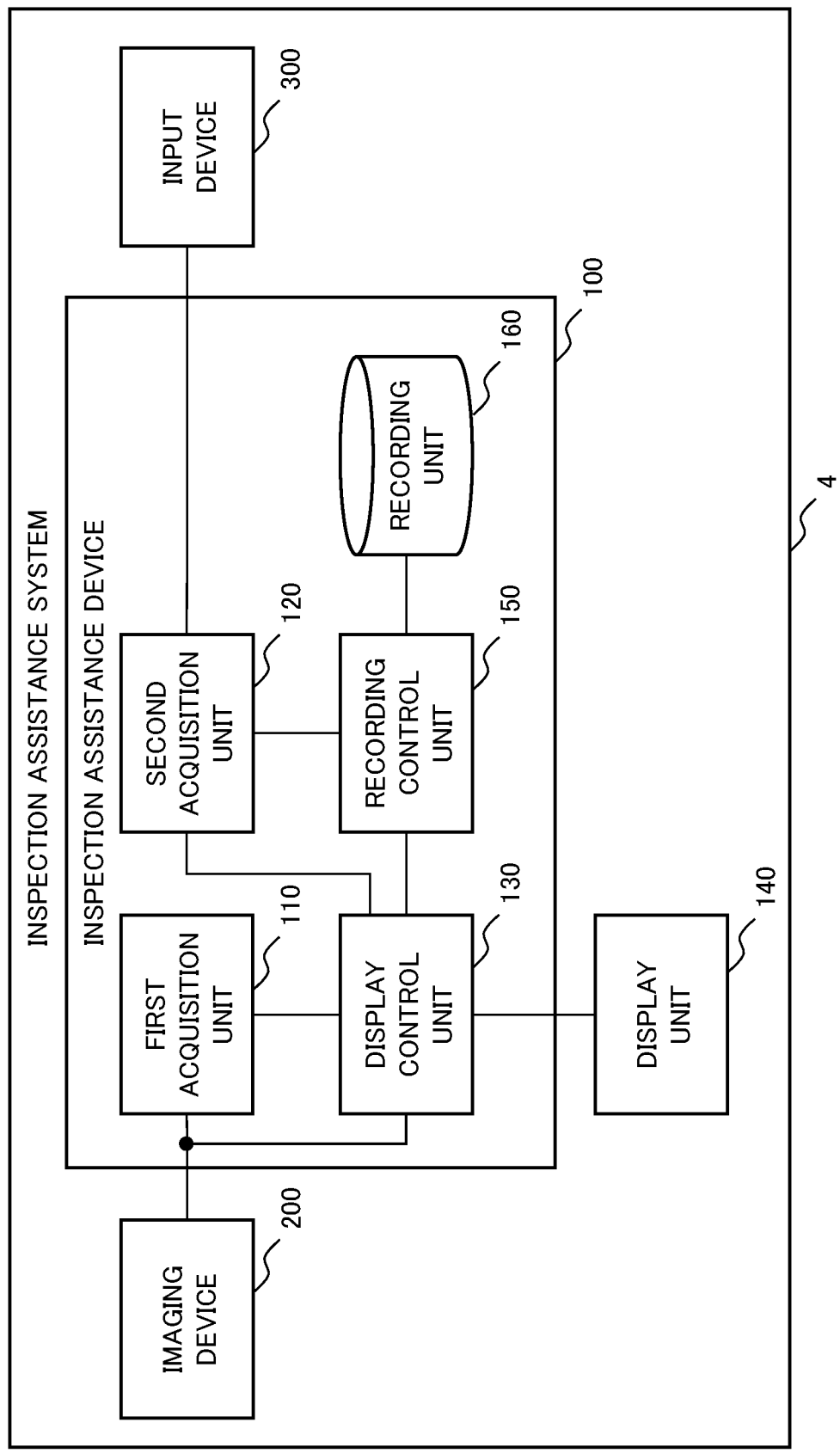
FIG. 4 is a diagram illustrating a configuration example of an inspection assistance system including an inspection assistance device according to a second example embodiment.

Next, a second example embodiment of the present disclosure based on the aforementioned first example embodiment will be described with reference to drawings. FIG. 4 is a diagram illustrating a configuration example of an inspection assistance system 4 including an inspection assistance device 100 according to the present example embodiment. As illustrated in FIG. 4, the inspection assistance system 4 includes the inspection assistance device 100, an imaging device 200, an input device 300, and a display unit 140.

Figure 5:
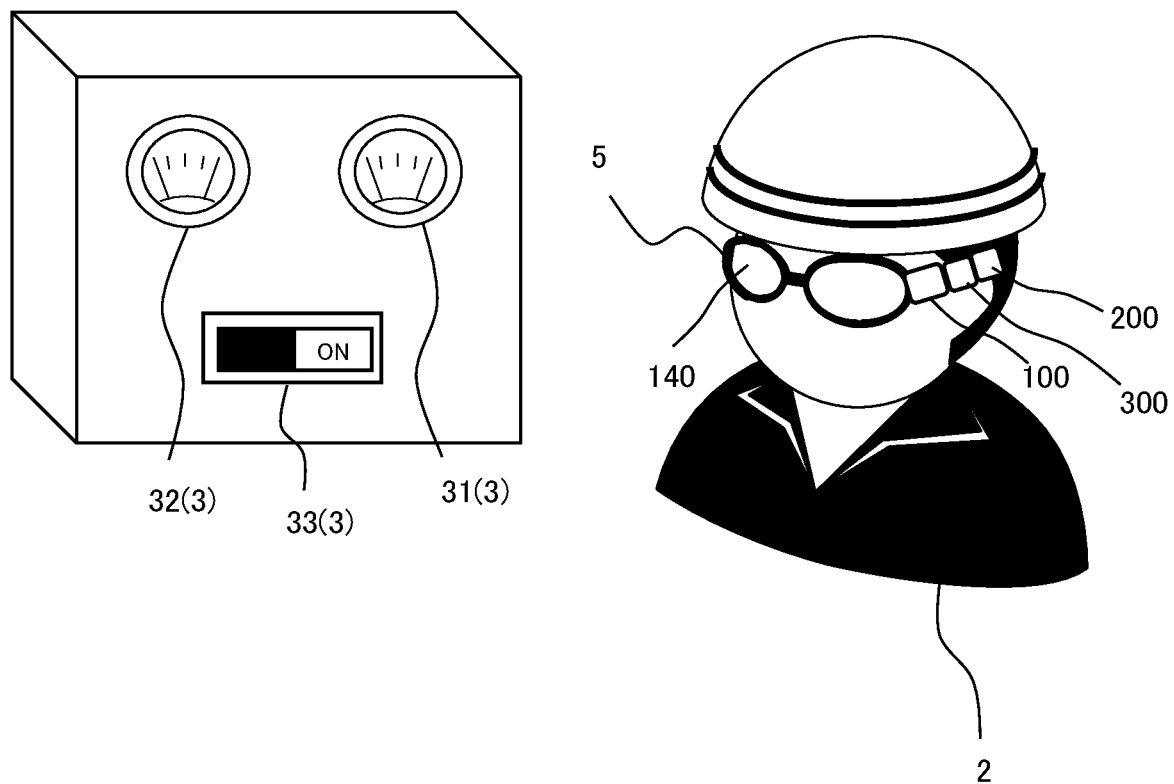
FIG. 5 is a diagram illustrating an application example of the inspection assistance system illustrated in FIG. 4.

FIG. 5 is a diagram illustrating an application example of the inspection assistance system 4 illustrated in FIG. 4. As illustrated in FIG. 5, the inspection assistance device 100, the imaging device 200, and the input device 300 included in the inspection assistance system 4 are equipped on wearable glasses 5. The inspection assistance device 100 and the input device 300 may be equipped on a server device communicable with the wearable glasses 5. Part of functions of the inspection assistance device 100 (for example, a first acquisition unit 110, a second acquisition unit 120, and a display control unit 130 illustrated in FIG. 4) may be equipped on the wearable glasses 5.

For example, by a worker 2 wearing the wearable glasses 5 turning his/her face toward an inspection target 3 such as a measuring instrument, the imaging device 200 on the wearable glasses 5 captures an image of the inspection target 3. The captured image is displayed on the display unit 140 being a lens part of the wearable glasses 5.

For example, an inspection target 3 is a sensor such as a thermometer, a switch, a structure, or the like being a target of inspection. An inspection target 3 is not particularly limited as long as the inspection target 3 serves as an inspection target. Inspection targets 3 according to the present example embodiment will be described on an assumption that the inspection targets 3 are a thermometer 31, a thermometer 32, and a switch 33. The inspection target 3 may be an entire device including the thermometer 31, the thermometer 32, and the switch 33.

The imaging device 200 captures an image of the inspection target 3 and generates image data representing the captured image. The generated image data may be stored in the imaging device 200 or may be stored in a storage device different from the imaging device 200. An image captured by the imaging device 200 may be a dynamic image or a static image. Upon generating image data, the imaging device 200 may provide the image data for the inspection assistance device 100.

For example, the input device 300 is a device for the worker 2 to input an instruction. For example, the input device 300 may be a microphone being capable of collecting voice of the worker 2 and being equipped on the wearable glasses 5, or the like. Further, the input device 300 may be a device, such as a keyboard, separate from the wearable glasses 5. Further, the input device 300 may be a mobile terminal including a touch panel and being separate from the wearable glasses 5, or the like. Input data representing information input to the input device 300 may be stored in the input device 300 or may be stored in a storage device different from the input device 300. Further, upon accepting voice input or text input, the input device 300 may provide input data representing the accepted information for the inspection assistance device 100.

Next, a configuration of the inspection assistance device 100 will be described. As illustrated in FIG. 4, the inspection assistance device 100 includes a first acquisition unit 110, a second acquisition unit 120, a display control unit 130, a recording control unit 150, and a recording unit 160. The recording unit 160 may be provided by a storage device different from the inspection assistance device 100.

The first acquisition unit 110 is an example of the first acquisition unit 11 according to the first example embodiment. The first acquisition unit 110 acquires first data being image data used for acquiring an inspection result of an inspection target 3. For example, the first acquisition unit 110 may acquire entire image data representing an image captured by the imaging device 200 as first data or may acquire part of the image data as first data. The part of the image data may be one of a plurality of frames constituting the image data or may be image data representing an image of a region including the inspection target 3 (partial image). The first acquisition unit 110 has only to be image data by which an inspection result of the inspection target 3 can be acquired. By the first acquisition unit 110 acquiring part of the image data captured by the imaging device 200, an amount of data can be reduced compared with a case of acquiring the entire image data. The first acquisition unit 110 provides the acquired first data for the display control unit 130.

The second acquisition unit 120 is an example of the second acquisition unit 12 according to the first example embodiment. The second acquisition unit 120 acquires second data being used for acquiring an inspection result of an inspection target 3 and being a different type of data from first data. Second data may be input data representing voice or text input by the worker 2 through the input device 300. Further, when the input device 300 is a software keyboard which the display control unit 130 causes the display unit 140 to display, the second acquisition unit 120 may acquire information indicating a position of a finger of the worker 2 as second data. The second acquisition unit 120 provides second data for the display control unit 130.

The display control unit 130 is an example of the display control unit 13 according to the first example embodiment. The display control unit 130 superimposes a comparison result between information about an inspection result based on acquired first data and information about an inspection result based on acquired second data on an image in which an inspection target is displayed and cause the display unit 140 to display the resulting image.

The display control unit 130 receives first data from the first acquisition unit 110 and based on the received first data, acquires information (referred to as first inspection result information) about an inspection result of an inspection target 3 included in an image represented by the first data. For example, the display control unit 130 recognizes an inspection target 3 included in first data. The display control unit 130 may recognize a type of the inspection target 3 (for example, a thermometer or a hygrometer) from first data. A method of recognizing an inspection target 3 by the display control unit 130 is not particularly limited, and an arbitrary method may be employed. Then, the display control unit 130 recognizes a state of the inspection target 3 recognized from the first data. For example, when the inspection target 3 is a thermometer, the display control unit 130 recognizes temperature indicated by the thermometer as first data. Consequently, the display control unit 130 acquires the recognition result of the inspection target 3 and the recognition result of the state indicated by the inspection target 3 as first inspection result information.

Further, the display control unit 130 receives second data from the second acquisition unit 120, and based on the received second data, acquires information (referred to as second inspection result information) about an inspection result of an inspection target 3. For example, when the input device 300 is a keyboard, or the input device 300 is a device including a touch panel and the worker 2 performs input by use of a software keyboard displayed on the touch panel, second data represent text. In such a case, the display control unit 130 may acquire second data as second inspection result information. Further, when the input device 300 is a software keyboard which the display control unit 130 causes the display unit 140 to display, second data are information indicating a position of a finger of the worker 2, as described above. In such a case, the display control unit 130 may identify information input by the worker 2 from information about the software keyboard which the display control unit 130 causes the display unit 140 to display and the second data, and acquire the identified information (for example, a character string) as second inspection result information.

Further, for example, when the input device 300 is a device including a touch panel and information representing a line or a point drawn on the touch panel by the worker 2 is second data, the display control unit 130 may acquire second inspection result information, based on the second data. For example, when the worker 2 draws a numeral on the touch panel, the display control unit 130 acquires the numeral from information about a line drawn by the worker. Further, when second data are voice data, the display control unit 130 may acquire voice of the worker 2 included in the voice data and acquire an utterance content acquired from the acquired voice as second inspection result information.

Then, the display control unit 130 compares the first inspection result information with the second inspection result information. The display control unit 130 superimposes the comparison result on an image in which the inspection target 3 is displayed and causes the display unit 140 to display the resulting image. For example, the image in which the inspection target 3 is displayed is an image represented by the first data acquired by the first acquisition unit 110. When the first image acquired by the first acquisition unit 110 is represented by image data composed of a plurality of frames, the image in which the inspection target 3 is displayed may be a frame in the plurality of frames.

For example, as illustrated in FIG. 5, the display unit 140 is a lens part of the wearable glasses 5, and is provided by, for example, a display module transmitting external light and displaying information in accordance with an instruction from the display control unit 130 but is not limited to the above. The display unit 140 may be a module having a function of displaying information generated by the display control unit 130 on a retina of the worker 2. Thus, the display unit 140 may have a function of projecting information generated by the display control unit 130 in accordance with control by the display control unit 130. The function of projecting information generated by the display control unit 130 may be included in the display control unit 130. For example, assuming that the display unit 140 is a retina, the display control unit 130 may have a function of directly projecting generated information on the retina.

The recording control unit 150 receives a comparison result from the display control unit 130 and records the comparison result in association with information about an inspection target 3 into the recording unit 160. For example, information about an inspection target 3 includes an inspection target name indicating the inspection target 3 and an inspection item for the inspection target 3. Information about an inspection target 3 is not limited to the above and may include other information.

While it is assumed that the recording control unit 150 according to the present example embodiment records the associated information into the recording unit 160, the recording control unit 150 may be configured to record the associated information by outputting the information to paper, the display unit 140, or another medium.

For example, the recording unit 160 is provided by a hard disk drive. The recording unit 160 records a comparison result and information about an inspection target 3 associated with each other by the recording control unit 150.

Figure 6:
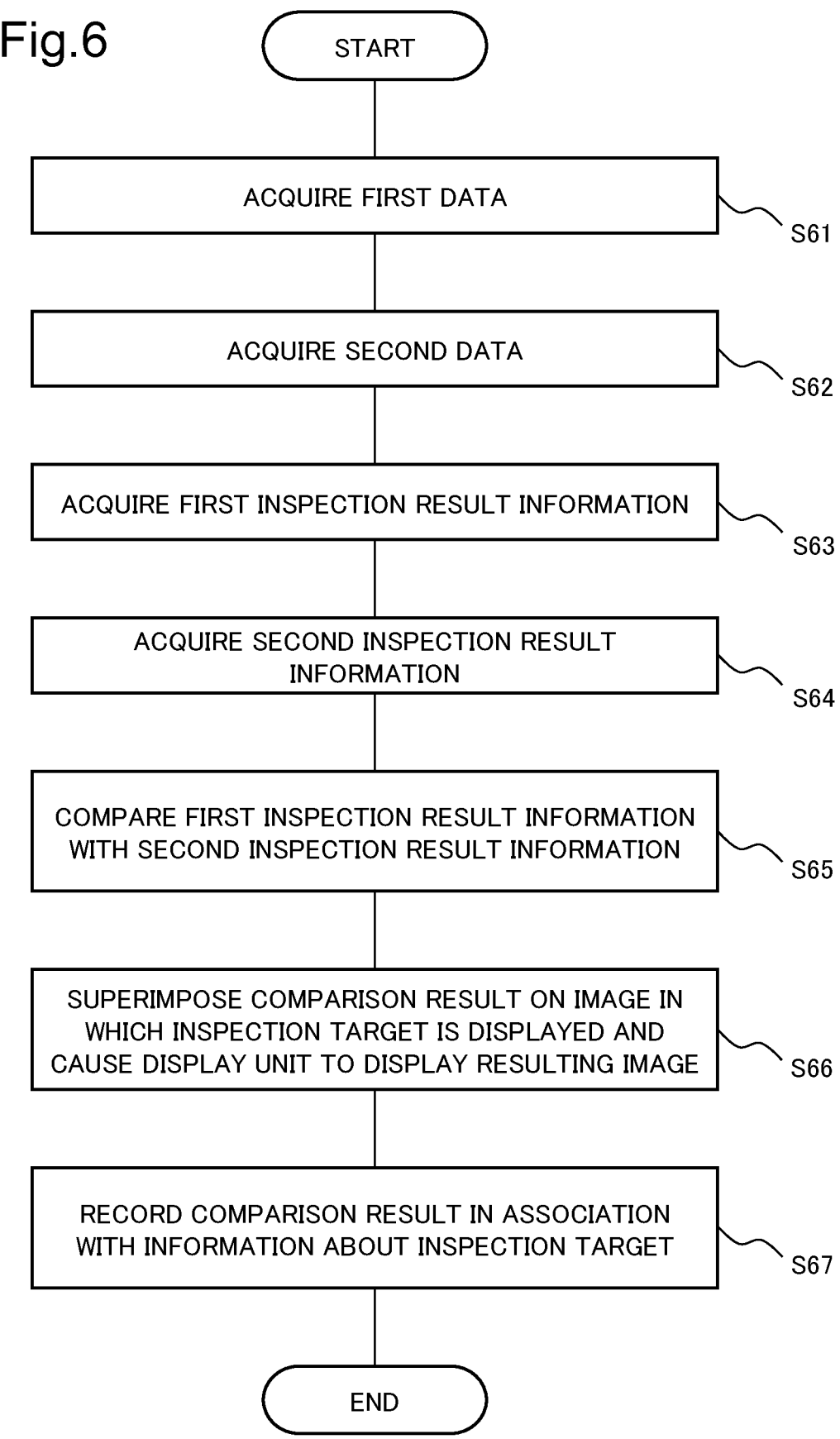
FIG. 6 is a flowchart illustrating an example of a processing flow in the inspection assistance device according to the second example embodiment.

FIG. 6 is a flowchart illustrating an example of a processing flow in the inspection assistance device 100 according to the present example embodiment. As described in FIG. 6, the first acquisition unit 110 acquires first data being image data used for acquiring an inspection result of an inspection target (Step S61). Further, the second acquisition unit 120 acquires second data being used for acquiring an inspection result of the inspection target and being a different type of data from the first data (Step S62). Step S61 and Step S62 may be performed simultaneously or may be performed in reverse order.

Figures 7, 8:
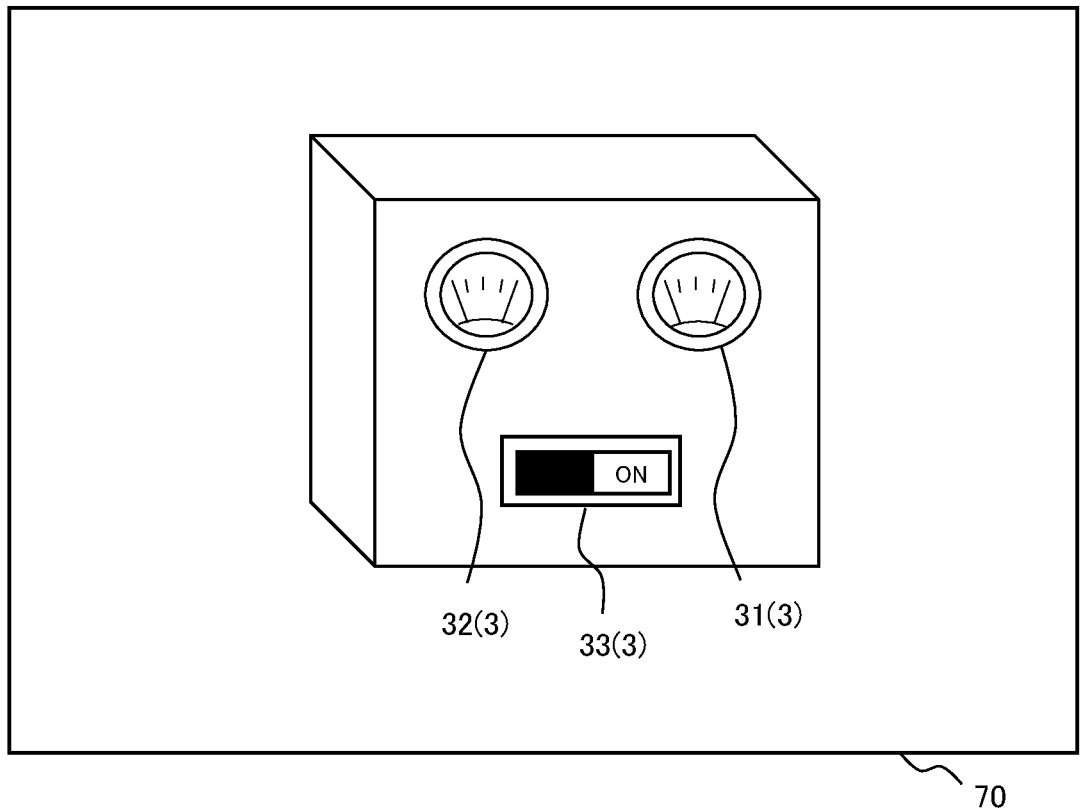
FIG. 7 is a diagram illustrating an example of an image represented by image data acquired by an image data acquisition unit.
FIG. 8 is a diagram illustrating an example of first inspection result information acquired from first data by a display control unit.

FIG. 7 illustrates an example of an image represented by the first data acquired by the first acquisition unit 110 in Step S61. As illustrated in FIG. 7, an image 70 represented by the first data acquired by the first acquisition unit 110 includes two thermometers (a thermometer 31 and a thermometer 32) and a switch 33 as inspection targets 3. This example will be described on an assumption that the second data acquired in Step S62 are voice data.

Next, the display control unit 130 acquires first inspection result information about an inspection result based on the first data acquired in Step S61 (Step S63). FIG. 8 is a diagram illustrating an example of first inspection result information 80 acquired from the first data by the display control unit 130. The display control unit 130 acquires, from the first data, the first inspection result information 80 including an inspection target name 81 being information for identifying an inspection target and state information 82 indicating a state of the inspection target indicated by the inspection target name 81, as illustrated in FIG. 8. For example, the first inspection result information 80 is stored in a storage unit in the display control unit 130. The first inspection result information 80 is not limited to the information illustrated in FIG. 8 and has only to be information about an inspection result of the inspection target 3.

Figures 9, 10:
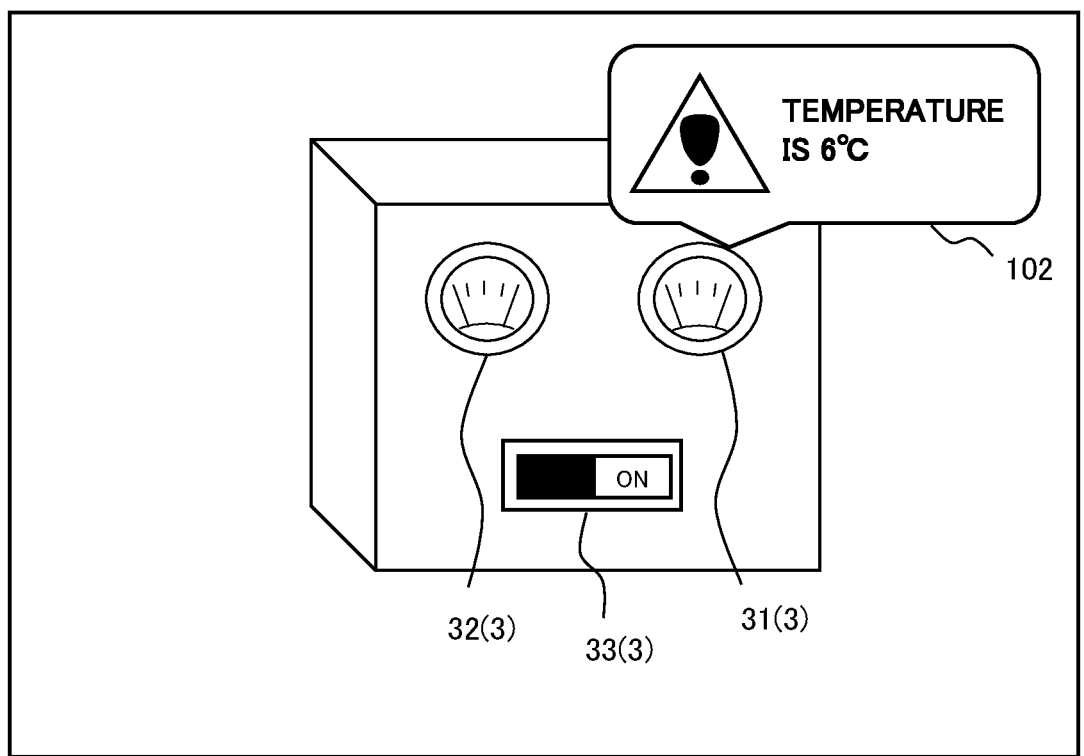
FIG. 9 is a diagram illustrating an example of second inspection result information acquired from second data by the display control unit.
FIG. 10 is a diagram illustrating an example of a display screen displayed by a display unit.

Further, the display control unit 130 acquires second inspection result information about an inspection result based on the second data acquired in Step S62 (Step S64). FIG. 9 is a diagram illustrating an example of second inspection result information 90 acquired from the second data by the display control unit 130. For example, it is assumed that the second data are voice data representing a voice "Thermometer 31, 4° C. Thermometer 32, 10° C. Thermometer 32, ON." In this case, the display control unit 130 performs predetermined voice analysis processing on the second data and acquires, from the second data, the second inspection result information 90 including an inspection target name 91 being information for identifying an inspection target and inspection result information 92 indicating an inspection result of an inspection target related to the inspection target name 91, as illustrated in FIG. 9. Then, the display control unit 130 stores the second inspection result information 90 into, for example, the storage unit in the display control unit 130. The second inspection result information 90 is not limited to the information illustrated in FIG. 9 and has only to be information about an inspection result of the inspection target 3.

Step S63 and Step S64 may be performed simultaneously or may be performed in reverse order.

Then, the display control unit 130 compares the first inspection result information with the second inspection result information (Step S65). Subsequently, the display control unit 130 superimposes the comparison result in Step S65 on an image in which the inspection target is displayed and causes the display unit 140 to display the resulting image (Step S66).

FIG. 10 is a diagram illustrating an example of a display screen 101 displayed by the display unit 140. It is assumed that the display unit 140 displays an image similar to the image 70 illustrated in FIG. 7. The display control unit 130 causes the display unit 140 to display the display screen 101 acquired by superimposing the comparison result in Step S65 on the image 70 illustrated in FIG. 7. Referring to FIG. 8 and FIG. 9, the first inspection result information 80 and the second inspection result information 90 differ in the temperature of the thermometer 31. Accordingly, the display control unit 130 superimposes a comparison result 102 indicating a mismatch between the temperatures of the thermometer 31 on the image 70 illustrated in FIG. 7 and causes the resulting image to be displayed.

Thus, when a comparison result indicates a mismatch, the display control unit 130 may cause the display unit 140 to display the comparison result in such a manner that the mismatch between the first inspection result information and the second inspection result information can be grasped. When state information 82 included in the first inspection result information 80 differs from inspection result information 92 included in the second inspection result information 90, the display control unit 130 causes information including the state information 82 to be displayed as the comparison result 102 in FIG. 10; however, a display method of the comparison result 102 is not limited to the above.

Figures 11, 12:
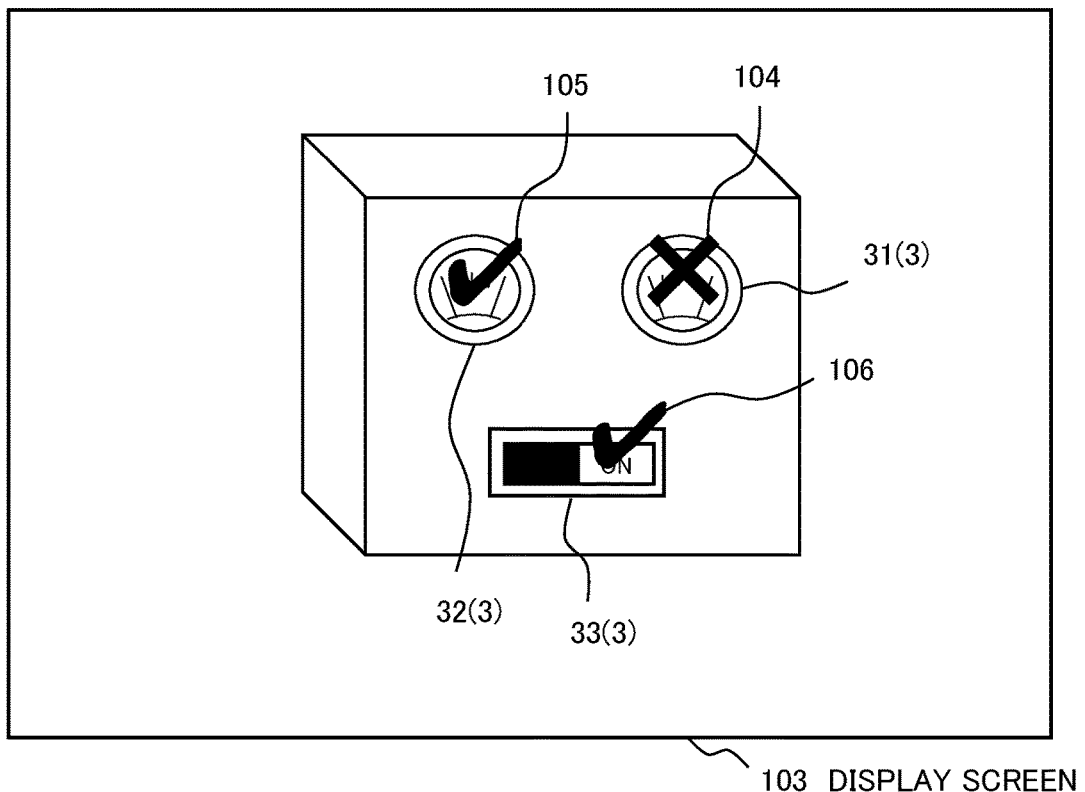
FIG. 11 is a diagram illustrating another example of a display screen displayed by the display unit.
FIG. 12 is a diagram illustrating an example of recorded information recorded in a recording unit.

FIG. 11 is a diagram illustrating an example of a display screen 103 displayed by the display unit 140. The display control unit 130 may display the display screen 103 as illustrated in FIG. 11. When a comparison result indicates a match, the display control unit 130 may cause the display unit 140 to display check marks 105 and 106 each indicating a match as the comparison result, as illustrated in FIG. 11. Further, when a comparison result indicates a mismatch, the display control unit 130 may cause the display unit 140 to display a cross 104 indicating a mismatch as the comparison result. Further, the display control unit 130 may cause the comparison result 102 illustrated in FIG. 10 to be further displayed on the display screen 103 illustrated in FIG. 11. Further, the display control unit 130 may cause the check marks 105 and 106 to be displayed on the display screen 101 illustrated in FIG. 10.

By causing the display unit 140 to display such a display screen 101 or display screen 103, the display control unit 130 can allow the worker 2 to readily grasp a comparison result.

After Step S66 ends, the recording control unit 150 records the comparison result in association with information about the inspection target 3 into the recording unit 160 (Step S67). The above concludes the processing by the inspection assistance device 100.

FIG. 12 is a diagram illustrating an example of recorded information 121 recorded in the recording unit 160. As illustrated in FIG. 12, the recorded information 121 includes an inspection target name 122 indicating an inspection target 3 and an inspection item 123 for the inspection target 3 that constitute information about the inspection target 3, and a comparison result 124. A comparison result 124 column includes "MATCH" indicating that first inspection result information matches second inspection result information or "MISMATCH" indicating that first inspection result information differs from second inspection result information. The recorded information 121 is not limited to the information illustrated in FIG. 12 and may include, for example, first data, first inspection result information, second data, second inspection result information, and information indicating whether or not inspection work is performed.

Thus, the inspection assistance device 100 according to the present example embodiment superimposes a comparison result between first inspection result information about an inspection result based on acquired first data and second inspection result information about an inspection result based on acquired second data on an image in which an inspection target 3 is displayed and causes the display unit 140 to display the resulting image. Consequently, the worker 2 checking a screen displayed on the display unit 140 can grasp the inspection target 3, the first inspection result information, and the second inspection result information. Consequently, the worker 2 can readily grasp whether or not the first inspection result information matches the second inspection result information merely by looking at the screen.

For example, when being used to a repetitive action or inspection work, the worker 2 may make an input mistake or mistakenly grasp an inspection result. However, the inspection assistance device 100 according to the present example embodiment compares information about an inspection result based on image data with information about an input inspection result and therefore can allow the worker 2 to grasp a possibility of an input mistake even when the mistake by the worker 2 occurs.

Further, by the comparison result being superimposed on an image in which an inspection target 3 is displayed and the resulting image being displayed, the worker 2 can grasp the comparison result while turning his/her line of sight toward the inspection target 3. Accordingly, since the comparison result between the first inspection result information and the second inspection result information with respect to the inspection target 3 can be readily grasped, even when the comparison result indicates a mismatch between the first inspection result information and the second inspection result information, the worker 2 can readily grasp the difference. Accordingly, the present example embodiment can prevent the worker 2 from overlooking a difference between inspection results. Accordingly, the inspection assistance device 100 according to the present example embodiment can enhance efficiency of inspection work.

Further, by the recording control unit 150 recording information about an inspection target 3 and a comparison result in association with each other, whether or not an inspection result is correct can be checked at a predetermined timing.

When a comparison result indicates that first inspection result information matches second inspection result information, the recording control unit 150 may record the comparison result and information about an inspection target 3 related to the comparison result in association with each other. Consequently, the inspection assistance device 100 can prevent intentionally falsified second inspection result information from being recorded into the recording unit 160 as an inspection result.

Figure 13:
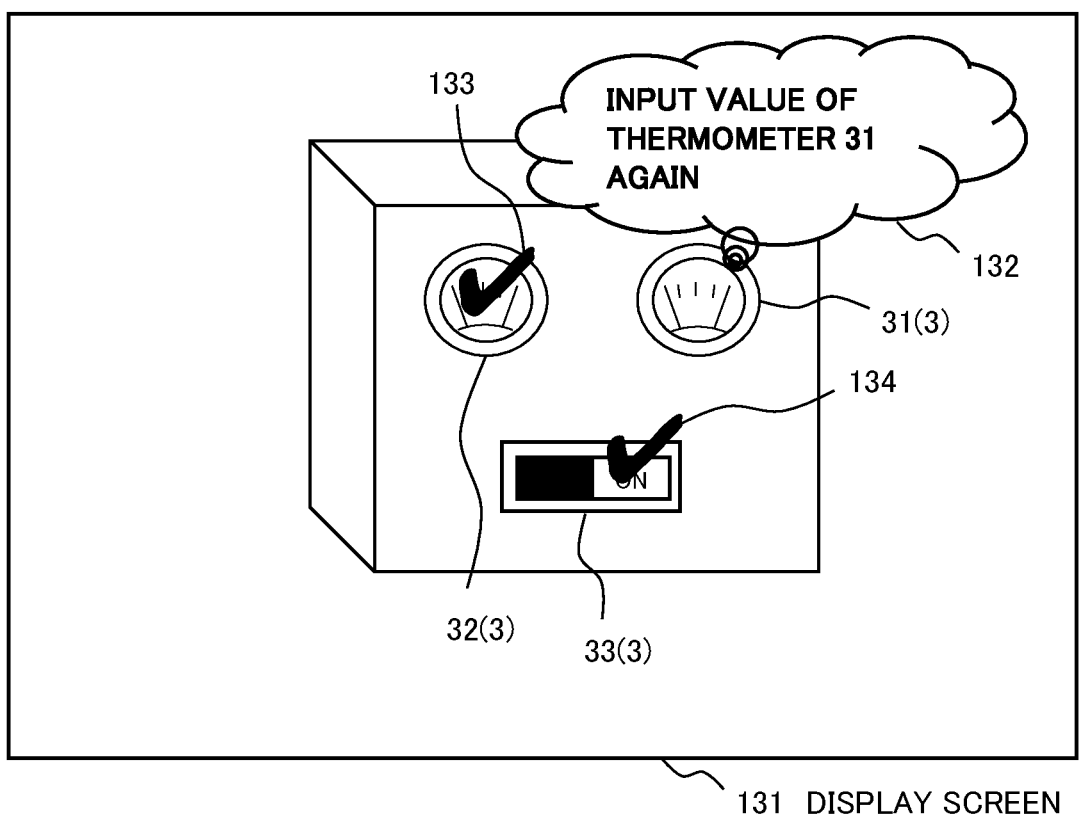
FIG. 13 is a diagram illustrating another example of a display screen displayed by the display unit.

Further, the display control unit 130 may cause the display unit 140 to display a screen according to a comparison result. When a comparison result indicates a mismatch, an input mistake by the worker 2 may be considered. In such a case, the display control unit 130 may cause the display unit 140 to display a display screen 131 as illustrated in FIG. 13 as a comparison result. The display screen 131 illustrated in FIG. 13 includes information 132 prompting the worker 2 to input second data, as a comparison result. Further, at this time, the display control unit 130 may cause the display unit 140 to display check marks 133 and 134 each indicating a match as a comparison result, similarly to FIG. 11.

Thus, by the display control unit 130 causing the display unit 140 to display information prompting input of second data, an input mistake or an overlook of an inspection result by the worker 2 can be prevented.

Figures 14, 15:
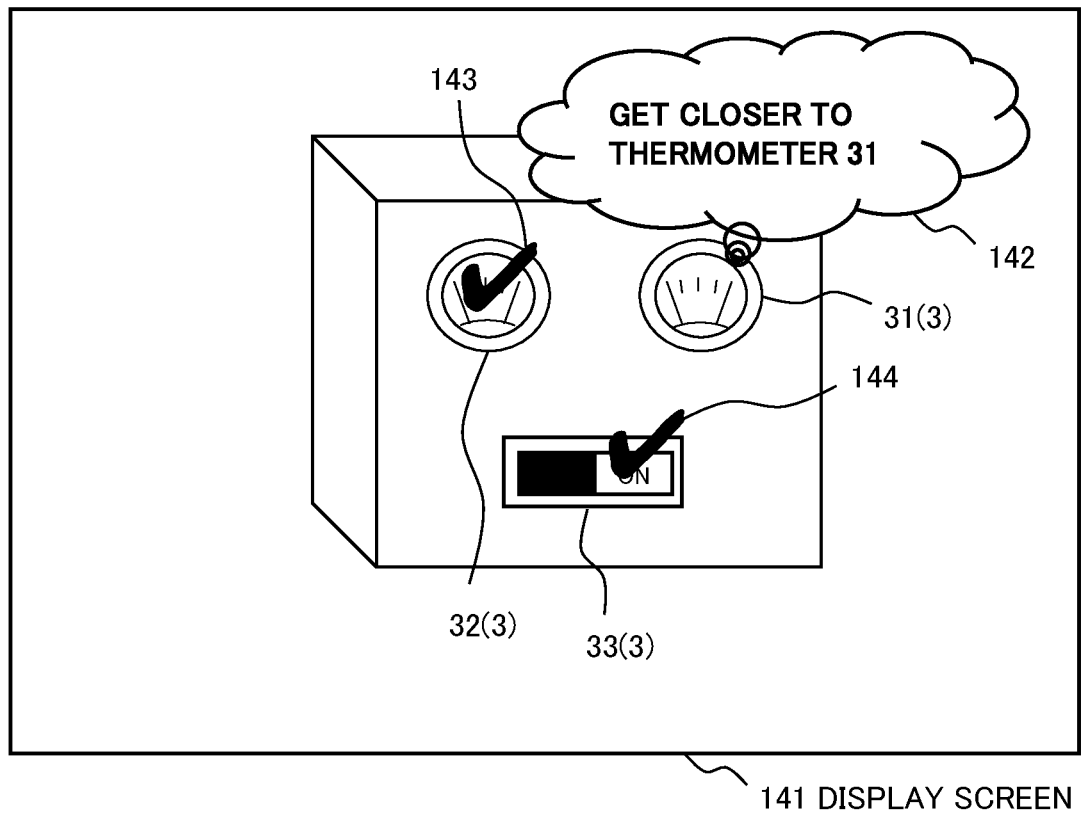
FIG. 14 is a diagram illustrating another example of a display screen displayed by the display unit.
FIG. 15 is a diagram illustrating an example of inspection target information.

Further, when a comparison result is a mismatch, information recognized from first data by the display control unit 130 may be mistaken. In such a case, the display control unit 130 may cause the display unit 140 to display a display screen 141 as illustrated in FIG. 14 as a comparison result. The display screen 141 illustrated in FIG. 14 includes information 142 prompting image capture of an inspection target 3, as a comparison result. When the imaging device 200 captures a dynamic image, the display control unit 130 may display information prompting the worker 2 to get closer to a thermometer 31 being an inspection target 3 in order to acquire first data from which the thermometer 31 can be more readily recognized, as illustrated in FIG. 14. By the worker 2 following the displayed information getting closer to the thermometer 31, the imaging device 200 equipped on the wearable glasses 5 can capture an image of the thermometer 31.

Further, in a case of a comparison result indicating a mismatch, when brightness of a place where an image is captured is detected and a value indicating the detected brightness is greater than a predetermined value, the display control unit 130 may display, on the display unit 140, information indicating an instruction to adjust the brightness and photograph again. Thus, the display control unit 130 may display, on the display unit 140, information prompting capture of an image providing higher recognition accuracy. Further, at this time, the display control unit 130 may cause the display unit 140 to display check marks 143 and 144 each indicating a match, as a comparison result, similarly to FIG. 11.

The display control unit 130 may first cause the information 132 being illustrated in the display screen 131 and prompting the worker 2 to input second data to be displayed and when a subsequent comparison result indicates a mismatch, cause the information 142 being illustrated in the display screen 141 and prompting the worker 2 to capture an image of an inspection target 3 to be displayed, or may perform the above actions in reverse order. Further, when a comparison result indicates a mismatch, the display control unit 130 may check an imaging environment, and cause the display screen 131 to be displayed when the imaging environment satisfies a predetermined condition and cause the display screen 141 to be displayed when the condition is not satisfied.

Further, checking whether or not a state of an inspection target 3 satisfies a condition may be considered an inspection item. In such a case, the display control unit 130 may determine whether or not a condition included in information about the inspection target 3 is satisfied and set the determination result as first inspection result information. FIG. 15 illustrates an example of information about an inspection target 3 in this case. FIG. 15 is a diagram illustrating an example of inspection target information 151 being information about an inspection target 3. While the inspection target information 151 according to the present example embodiment will be described on an assumption that the inspection target information 151 is stored in the recording unit 160, the inspection target information 151 may be stored in a storage device separate from the recording unit 160.

The inspection target information 151 includes an inspection target name 152, an inspection item 153, and a condition 154. A condition 154 indicates a value or a state to be satisfied by an inspection target. For example, when an inspection target 3 is a thermometer, a condition 154 indicates temperature to be satisfied. As illustrated in FIG. 15, a condition 154 to be satisfied by a thermometer 31 is less than 5° C., a condition 154 to be satisfied by a thermometer 32 is less than 14° C., and a condition 154 to be satisfied by a switch 33 is being in an "ON" state.

It is assumed that the display control unit 130 recognizes the state information 82 illustrated in FIG. 8 from first data. In other words, it is assumed that the thermometer 31 indicates 6° C., the thermometer 32 indicates 10° C., and the switch 33 is ON. The display control unit 130 refers to the inspection target information 151 stored in the recording unit 160 through the recording control unit 150 and determines whether or not the recognized state information satisfies the conditions. As illustrated in FIG. 15, the value of the thermometer 31 does not satisfy the condition being less than 5° C., and therefore the display control unit 130 sets information indicating that the condition is not satisfied as first inspection result information related to the thermometer 31. Further, the display control unit 130 sets information indicating that the condition is satisfied as first inspection result information related to each of the thermometer 32 and the switch 33.

Further, the worker 2 inputs information indicating whether or not a condition for each inspection target is satisfied, as second data. The second acquisition unit 120 acquires the input second data. The display control unit 130 acquires second inspection result information, based on the second data. It is assumed that the second inspection result information is information indicating whether or not a condition for each inspection target is satisfied, similarly to the second data information.

FIG. 16 is a diagram illustrating an example of recorded information 161 recorded in the recording unit 160. The recorded information 161 includes an inspection target name 152, an inspection item 153, and a condition 154 that constitute information about an inspection target 3. Further, the recorded information 161 includes state information 165, first inspection result information 166, second inspection result information 167, and a comparison result 168. The recorded information 161 may not include the state information 165, the first inspection result information 166, and the second inspection result information 167.

The first inspection result information 166 and the second inspection result information 167 indicate whether or not a condition for each inspection target is satisfied. In FIG. 16, "OK" is set when the condition is satisfied, and "NG" is set when the condition is not satisfied. The comparison result 168 indicates whether or not first inspection result information matches second inspection result information. The comparison result 168 column includes "MATCH" indicating a match or "MISMATCH" indicating a mismatch. FIG. 16 tells that a comparison result related to the thermometer 31 is set to "MISMATCH." Consequently, for example, even when the worker 2 mistakenly inputs that a condition is satisfied through performing repetitive work, the display control unit 130 can cause the display unit 140 to display the comparison result. Further, by recording the recorded information 161 in the recording unit 160, the worker 2 can check whether or not an inspection result is mistaken in checking processing after inspection work.

Second data may be a value or a state indicated by an inspection target 3, similarly to the aforementioned inspection result information 92. Even in this case, the display control unit 130 may determine whether or not a condition 154 is satisfied and set the determination result as second inspection result information 167.

Further, the second acquisition unit 120 may acquire information indicating a predetermined action of the worker 2 as second data. For example, it is assumed on a screen in which an inspection target 3 is displayed that the worker 2 performs a check marking action with a finger when an inspection result satisfies a predetermined condition and performs a crossing action with a finger when the predetermined condition is not satisfied. Thus, the second acquisition unit 120 may acquire, as second data, information indicating a predetermined action performed by the worker 2, that is, information indicating a trace of a finger in this example. With such a configuration, the worker 2 can more easily input an inspection result of an inspection target 3.

Further, an inspection target 3 may be a structure such as a bridge. When an inspection target 3 is a structure, the display control unit 130 may cause the display unit 140 to display a comparison result by calculating a degree of degradation from first data and making a comparison with an input degree of degradation. A calculation method of a degree of degradation is not particularly limited and for example, may be a method of calculation based on color or a crack size, or a method of calculation from another state.

Hardware Configuration

Figure 17:
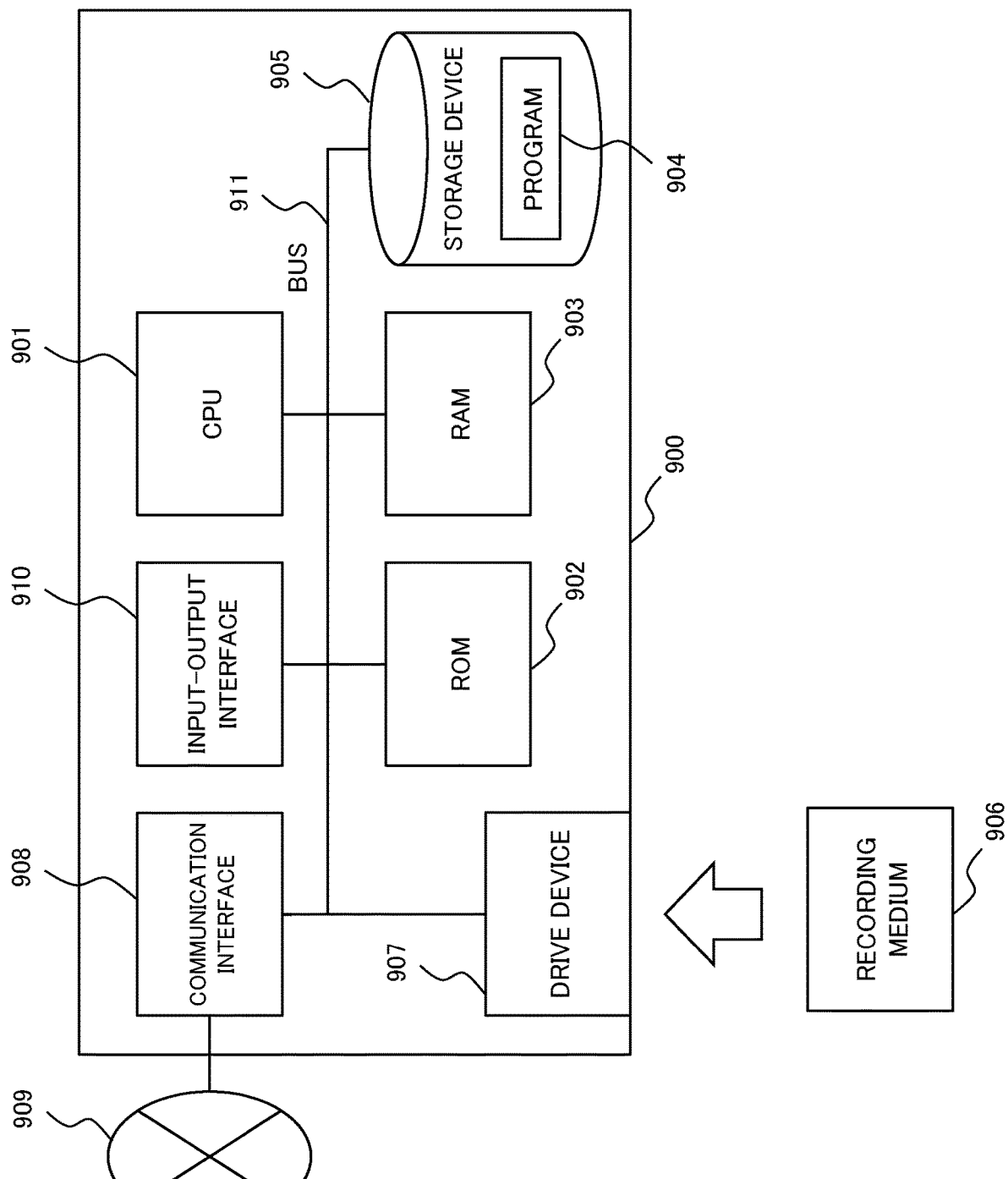
FIG. 17 is a diagram exemplarily illustrating a hardware configuration of a computer (information processing device) capable of providing each example embodiment.

Each component in the inspection assistance device (10, 100) according to each example embodiment of the present disclosure represents a function-based block. For example, a part or the whole of each component in the inspection assistance device (10, 100) is provided by an arbitrary combination of an information processing device 900 and a program, as illustrated in FIG. 17. FIG. 17 is a block diagram illustrating an example of a hardware configuration of the information processing device 900 providing each component in the inspection assistance device (10, 100). An example of the information processing device 900 includes the following configuration.

A central processing unit (CPU) 901
A read only memory (ROM) 902
A random access memory (RAM) 903
A program 904 loaded on the RAM 903
A storage device 905 storing the program 904
A drive device 907 for reading and writing of a recording medium 906

A communication interface 908 connected to a communication network 909

An input-output interface 910 inputting and outputting data

A bus 911 connecting each component

Each component in the inspection assistance device (10, 100) according to each example embodiment is provided by the CPU 901 acquiring and executing the program 904 providing the function of the component. For example, the program 904 providing the function of each component in the inspection assistance device (10, 100) is previously stored in the storage device 905 or the ROM 902, and is read by the CPU 901 as needed. The program 904 may be provided for the CPU 901 through the communication network 909, or may be previously stored in the recording medium 906, be read by the drive device 907, and be provided for the CPU 901.

There are various modified examples of a method of providing the inspection assistance device (10, 100). For example, the inspection assistance device (10, 100) may be provided by an arbitrary combination of an information processing device 900 and a program, the combination being separate for each component. Further, a plurality of components included in the inspection assistance device (10, 100) may be provided by an arbitrary combination of a single information processing device 900 and a program.

Further, a part or the whole of each component in the inspection assistance device (10, 100) is provided by another general-purpose or dedicated circuit, a processor, or the like, or a combination thereof. The above may be configured with a single chip or may be configured with a plurality of chips connected through a bus.

A part or the whole of each component in the inspection assistance device (10, 100) may be provided by a combination of the aforementioned circuit or the like, and a program.

When a part or the whole of each component in the inspection assistance device (10, 100) is provided by a plurality of information processing devices, circuits, or the like, the plurality of information processing devices, circuits, or the like may be arranged in a concentrated manner or be arranged in a distributed manner. For example, the respective information processing devices, circuits, or the like may be provided in a form of being connected with each other through a communication network such as a client-server system or a cloud computing system.

The respective aforementioned example embodiments are preferred example embodiments of the present disclosure, and the scope of the present disclosure is not limited to the respective aforementioned example embodiments; and a person skilled in the art may make example embodiments which include various changes through modifying and substituting the respective aforementioned example embodiments without departing from the spirit and scope of the present disclosure.

REFERENCE SIGNS LIST

1 Wearable glasses
2 Worker
3 Inspection target
4 Inspection assistance system
5 Wearable glasses
10 Inspection assistance device
11 First acquisition unit
12 Second acquisition unit
13 Display control unit
14 Display unit
31 Thermometer
32 Thermometer
33 Switch
100 Inspection assistance device
110 First acquisition unit
120 Second acquisition unit
130 Display control unit
140 Display unit
150 Recording control unit
160 Recording unit
200 Imaging device
300 Input device

The invention claimed is:

1. An inspection assistance device comprising:
at least one memory storing instructions; and
at least one processor connected to the at least one memory and configured to execute the instructions to:
acquire first data being image data used for acquiring a first inspection result of an inspection target;
acquire second data being used for acquiring a second inspection result input by a worker;
compare the first inspection result acquired from the image data with the second inspection result input by the worker; and
cause a display to display, by a diagram superimposed on the inspection target in the image data, a comparison result indicating whether the first inspection result matches the second inspection result.

2. The inspection assistance device according to claim 1, wherein, the at least one processor is configured to execute the instruction,
when the comparison result indicates a mismatch, to cause the display to display the comparison result in such a way that a mismatch between the first inspection result information and the second inspection result information can be grasped.

3. The inspection assistance device according to claim 1, wherein the at least one processor is configured to execute the instruction,
when the comparison result indicates a mismatch, to cause information prompting input of the second data to be displayed as the comparison result.

4. The inspection assistance device according to claim 1, wherein the at least one processor is configured to execute the instruction,
when the comparison result indicates a mismatch, to cause information prompting image capture of the inspection target to be displayed as the comparison result.

5. The inspection assistance device according to claim 1, further comprising the at least one processor is configured to execute the instruction
to record the comparison result and information about the inspection target in association with each other.

6. The inspection assistance device according to claim 5, wherein the at least one processor is configured to execute the instruction,
when the comparison result indicates a match, to record the comparison result and information about the inspection target in association with each other.

7. The inspection assistance device according to claim 1, wherein
the second data indicating an action of a finger of the worker are information indicating a position of a finger of the worker on a software keyboard.

8. The inspection assistance device according to claim 1, wherein
the second data indicating an action of a finger of the worker are information indicating a trace of a finger of the worker on a touch panel.

9. The inspection assistance device according to claim 1, wherein
the second data indicating an action of a finger of the worker are information indicating a trace of a finger of the worker.

10. An inspection assistance method comprising:
acquiring first data being image data used for acquiring a first inspection result of an inspection target;
acquiring second data being used for acquiring a second inspection result input by a finger of a worker;
compare the first inspection result acquired from the image data with the second inspection result input by the worker; and
causing a display to display, by a diagram superimposed on the inspection target in the image data, a comparison result indicating whether the first inspection result matches the second inspection result.

11. The inspection assistance method according to claim 10, further comprising,
when the comparison result indicates a mismatch, causing the display to display the comparison result in such a way that a mismatch between the first inspection result information and the second inspection result information can be grasped.

12. A computer-readable non-transitory recording medium having a program recorded thereon, the program causing a computer to execute:
processing of acquiring first data being image data used for acquiring a first inspection result of an inspection target;
processing of acquiring second data being used for acquiring a second inspection result input by a worker;
processing of comparing the first inspection result acquired from the image data with the second inspection result input by the worker; and
processing of causing a display to display, by a diagram superimposed on the inspection target in the image data, a comparison result indicating whether the first inspection result matches the second inspection result.

13. The recording medium according to claim 12, wherein,
when the comparison result indicates a mismatch, processing of causing the display to display the comparison result in such a way that a mismatch between the first inspection result information and the second inspection result information can be grasped.

* * * * *